United States Patent [19]

Ricketts et al.

[11] 3,997,718
[45] Dec. 14, 1976

[54] PREMIUM INTERACTIVE COMMUNICATION SYSTEM

[75] Inventors: Luther W. Ricketts; Paul M. Dormans, both of Fort Wayne, Ind.

[73] Assignee: The Magnavox Company, Fort Wayne, Ind.

[22] Filed: Nov. 11, 1974

[21] Appl. No.: 522,795

Related U.S. Application Data

[63] Continuation-in-part of Ser. No. 328,818, Feb. 1, 1973, abandoned.

[52] U.S. Cl. .................. 178/6.8; 178/DIG. 13; 325/31; 325/308; 325/55
[51] Int. Cl.$^2$ .................................. H04H 1/02
[58] Field of Search ............ 178/6.8, DIG. 13, 5.6, 178/5.8; 325/31, 308, 55, 58

[56] References Cited

UNITED STATES PATENTS

| | | | |
|---|---|---|---|
| 3,268,814 | 8/1966 | Du Vivier | 325/58 |
| 3,396,232 | 8/1968 | Hendrickson et al. | 178/5.1 |
| 3,647,976 | 3/1972 | Moses | 179/15 AL |
| 3,651,403 | 3/1972 | Fluck | 325/31 |
| 3,668,307 | 6/1972 | Face et al. | 178/5.6 |
| 3,676,580 | 7/1972 | Beck | 178/DIG. 13 |
| 3,730,988 | 5/1973 | Shimizu | 178/6.8 |
| 3,743,767 | 7/1973 | Bitzer | 178/5.6 |
| 3,836,888 | 9/1974 | Boenke | 178/DIG. 13 |
| 3,882,392 | 5/1975 | Harney | 178/DIG. 13 |

*Primary Examiner*—Robert L. Griffin
*Assistant Examiner*—Michael A. Masinick
*Attorney, Agent, or Firm*—Joe E. Barbee; Thomas A. Briody; William J. Streeter

[57] ABSTRACT

A cable television and communication system is disclosed which is suitable for community antenna television (CATV) closed circuit television (CCTV) and other types of signal distribution systems with service function applications such as for use in hotel, motel, apartment complexes, and the like. The system has the capability of distribution and subscriber reception of unencoded and encoded or limited access video and audio programs with simultaneous two way digital data communication. The subscriber units are interconnected by a tree-organized wideband communication link such as co-axial cable system with a network central unit. Subscriber unit identification control and data exchange is accomplished by the use of a high speed time-slot organized format with each subscriber being assigned a predetermined unique television synchronization related time-slot. The central unit utilizes a small digital computer which functions to provide network supervision and management of subscriber requests, accounting, billing and other processing such as viewing analysis. The system utilizes a modular configuration which allows for a low cost and simple initial installation capable of being later expanded to a more sophisticated version.

10 Claims, 7 Drawing Figures

PREMIUM INTERACTIVE COMMUNICATION SYSTEM

CROSS REFERENCE TO RELATED APPLICATION

This application is a continuation-in-part application of copending application Ser. No. 328,818, filed Feb. 1, 1973, now abandoned and entitled "Premium Interactive Communication System."

BACKGROUND OF THE INVENTION

The present invention relates to a wideband communication system for television signals which provides simultaneous two-way digital data communication between a central unit or distribution location and the various remote locations or subscriber units. The invention is particularly applicable to closed circuit and community or apartment antenna television systems, especially where automatic control and processing of for example, subscriber accounts and billing, subscriber requests and system monitoring or "polling" is desired. It is equally suitable for television antenna systems in, for example, hotels or hospitals where in addition to the distribution of television signals there is a requirement for automatic processing and accounting of patron service requests, room or patron status conditions and the like.

The first community antenna television systems were used in geographic areas where satisfactory television reception was not possible without the use of highly elevated or advantageously located directional and high gain antennas. The poor signal reception in these areas was usually due to adverse surrounding terrain resulting in signal shadow zones and/or excessive distance to the nearest television broadcast station. Because it was economically impractical for each television set owner in these fringe areas to install and maintain a suitable antenna system, a single advantageously located antenna array feeding a cable network for supplying each individual subscriber with a usable television signal came into use. In these early systems, the subscribers were usually limited in number as was the number of different television signals available for distribution; and as a result, the systems were simple in nature and the initial and recurring costs were minimal and subscriber fees and billing, if any, did not create problems.

With the increase in the number of television broadcasters and the greater increase in the number of television owners, distribution systems have become much more complex and costly. Illustrative of the present state of the art in these complex distribution systems are the patents to Face et. at. U.S. Pat. No. 3,668,307 and Moses U.S. Pat. No. 3,647,976. In addition, the realization that such systems have advantages in highly populated areas even where a substantial number of free television broadcast stations already exist results in systems which must serve many thousands of subscribers and distribute a considerable amount of program including special material requiring additional subscriber fees for its use or viewing. Such complex distribution systems require considerable supervision and control preferably as foolproof and automatic as possible and with a maximum of independence upon necessary subscriber actions.

It is therefore an object of the present invention to provide a cable television system which distributes either or both of commercial broadcast or "free" program material and "special pay" or "premium" program material.

It is another object of the present invention to provide for two way digital communication between subscribers and the network central unit simultaneous with the distribution of program material.

It is still another object of the present invention to provide a cable television signal distribution system which operation and functions are computer controlled and supervised.

It is a further object of the invention to provide a cable television distribution system which allows the subscriber to select at his discretion any of the several services provided by the system.

It is another object of the invention to provide a distribution system which performs accounting and billing functions for the type and amount of services utilized by each individual subscriber.

It is an object of the present invention to provide a cable distribution system which identifies subscribers in the system and accepts and facilitates commands or program requests from such subscribers.

Another object of the present invention is to provide each subscriber in the system with a specific time slot or group of time slots from which subscriber identification and message communication is possible without the need for special address communications.

An additional object of the present invention is to provide a subscriber control unit which recognizes its particular time slot by the counting of time slots.

Still another object of the present invention is the utilization of a time format which is digitally clocked and referenced to the commercial television scanning frequencies.

A further object of the present invention is to provide a television system, the "pay" or "premium" program material of which is scrambled or encoded to prevent unauthorized subscribers from benefiting therefrom and to periodically rearrange the coding sequence to further guard against unauthorized use.

The complexity of a television distribution system depends to a great extent on the amount of automation and control desired. In small systems with a limited number of remote locations and a limited amount of program material, it would not be economically feasible to install a highly automated and complex system such as those of the aforementioned patents when such a complex system is not required initially even though the more sophisticated system might be advantageous at a later date because of the increase in the number of subscribers and/or available program material and services.

Therefore it is another object of the present invention to provide a cable television system, the configuration of which is readily adaptable to expansion of control and function as the need arises.

Yet another object of the present invention is to provide an initially small scale economical installation having two way communication capabilities and premium program encoding which may later by expanded to meet growing subscriber needs without obsoleting the initial installation.

SUMMARY OF THE INVENTION

The foregoing as well as numerous other objects and advantages of the present invention are achieved by providing a distribution system comprising a network central station including a computer, computer interface, input-output equipment, and appropriate timing, encoding, and transmitting equipment for providing a plurality of down-stream television, data or other channels. The central station supplies these signals to a tree-organized wideband communication link such as a co-axial cable network which connects customer subscribers to the distribution system. Each subscriber's location comprises a subscriber control unit which interfaces the system with the subscriber's television set and perhaps other subscriber input-output equipment. The central unit may also include FM audio entertainment transmitters, FM data transmitters and receivers, and premium FM or television channel encoders. A clock timing generator is provided at the central unit to synchronize the entire distribution system at a commercial television scanning frequency related rate.

The present invention provides a two way cable television communication system which transmits video, audio, and digital data concurrently and provides a high speed time slot organized system which allows subscriber identification without the necessity of using digital identification preambles (addresses) for each subscriber.

It is accordingly a primary object of the present invention to reduce the cost of a two way cable television system to its subscribers.

BRIEF DESCRIPTION OF THE DRAWINGS

The aforementioned and other objects, features, and advantages of the present invention will become more apparent from the following detailed description thereof when considered in conjunction with the drawings wherein.

DESCRIPTION OF THE PREFERRED EMBODIMENT

General System Description

Figure 1:
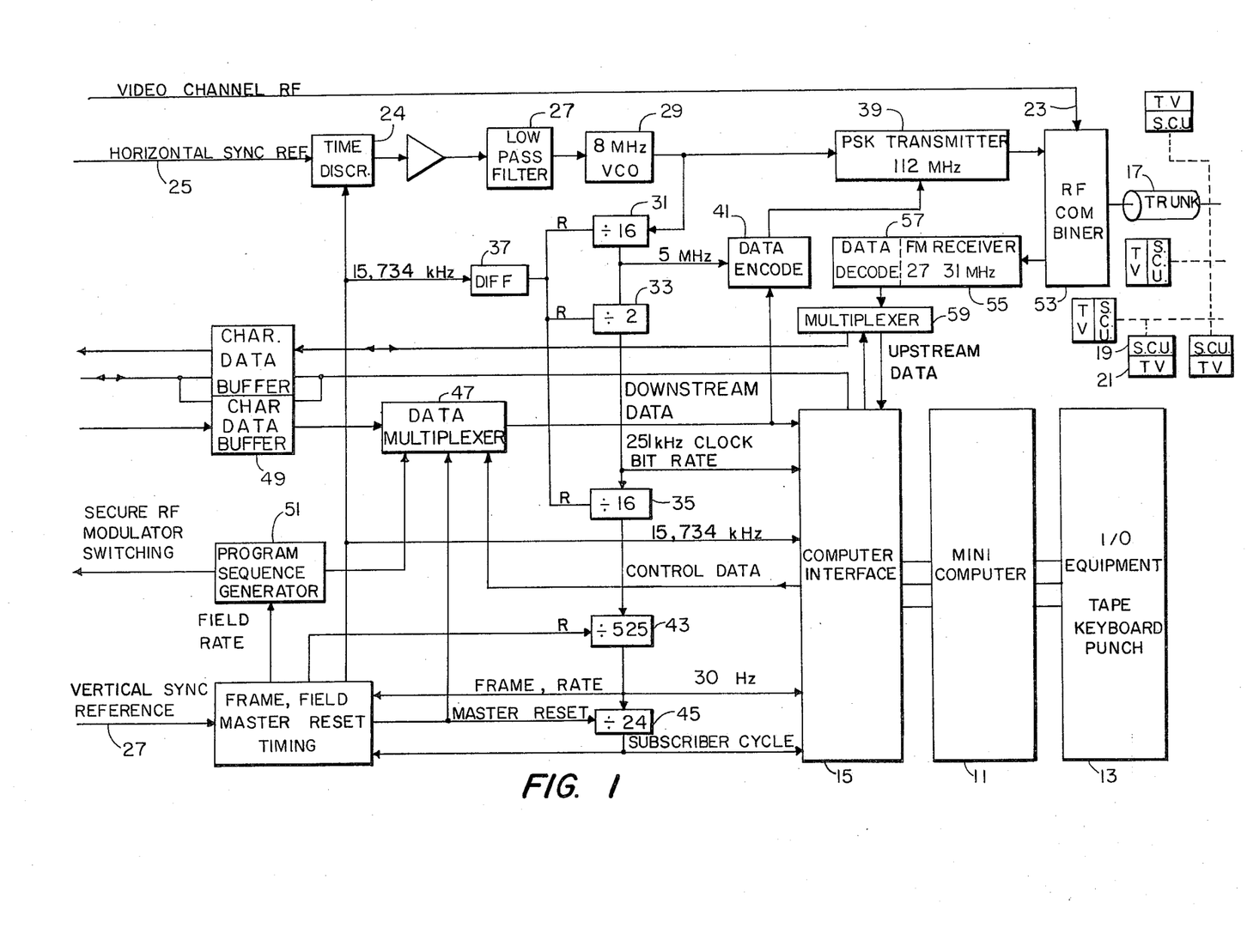
FIG. 1 is a block diagram illustrating the overall system broadly and the timing and interfacing at the central unit in detail.

Considering first FIG. 1, the overall system of the present invention is seen to comprise a mini-computer 11, the speed and storage capacity of which is tailored to the size and complexity of services to be offered in a specific installation. The computer communicates with typical input-output equipment 13 and by way of an interface unit 15 with the timing and encoding equipment of the central unit or so-called "head end" in a manner to be described in greater detail subsequently. The head end ultimately supplies a broad band of radio frequency signals to a trunk line 17 which distributes those signals by a tree-organized wideband communication link such as a co-axial cable to a plurality of subscriber units each of which comprises a subscriber control unit 19 and a standard television receiver 21. In addition to the television receiver, the subscriber may have coupled to his subscriber control unit, a standard FM radio, keyboard input, or virtually any other input-output device desired.

Each subscriber control unit 19 counts time intervals and recognizes its own unique time-slot for duplex data messages. This structuring allows mode time-sharing for one of many service functions. One can selectively enable special video and RF programming, special device control and message communications or partly line connections for video messages by way of a television set. Television frame related timing rates are used to accomplish a uniform locked network clocked system which is referenced at the central unit to provide synchronism for television raster related services. A locked digitally clocked time-slot sequence exists between the central unit and all of the subscriber units for an overall subscriber cycle time which is fixed, contiguous and repetitive. For example, 525 subscriber addresses exist in a standard television frame. Each subscriber control unit responds to a specific unique clock counted time-slot which is permanently set in the subscriber control unit and allows for the transmission and reception of brief duplex control messages of, for example, 16 bits during that subscriber's time-slot. For this example, the control bit rate would be 16 times the addressed clock rate of 15,734 cycles or 251.5 KHz. Each subscriber's address would thus correspond to a numbered horizontal raster line in one of, for example, 24 television frames to allow for 12,600 subscribers.

For downstream operation from the control unit the data may be Manchester encoded onto a phase shift keyed modulated radio frequency carrier, the frequency of which is harmonically related to the control data rate, the time-slot rate and the system frame rate. The Manchester encoded data form two equal energy side band spectrums about the virtual radio frequency pilot carrier and each subscriber terminal is provided with a phase locked receiver which tracks the virtual carrier to recover a 4.027 MHz clock signal which is divided down to the locked system clock rate of 251.5 KHz. The control data clock signal, address clock rate, and the field and frame rates may then be unambiguously obtained by binary divisions and data or system reset control of the binary counters. The digital modulation is separately extracted from the phase locked loop by side band demodulation and thus the data output is independent of the system clock rate and it is possible to run the data rate for digital terminal services at a higher rate than the 251.5 KHz system clock rate. This feature substantially enhances the system data handling capability.

The upstream transmitter encodes subscriber terminal data at the same clock rate of 251.5 KHz and the upstream radio frequency carrier is clocked by the downstream clock rate to locate it in the upstream spectrum. The upstream control and data information may be phase or frequency shift key modulated about the upstream pilot signal.

The cable network has many branches reaching into homes, complexes and various businesses and bi-directional signal distribution is accomplished by co-axial cable layouts of main trunks and feeder lines. Because of cable losses, the system may employ frequency selective line extender amplifiers to maintain uniform signal levels.

While the system operates on a synchronous basis related to the television synchronizing rate, the mini-computer 11 may be asynchronous therewith with the computer interface 15 providing buffering between the computer and the remainder of the system.

System Timing

The television synchronization related timing is organized so that a subscriber time-slot corresponds to one horizontal line of the television raster; however, it could also be organized to relate to any multiple or submultiple number of horizontal lines. With a one horizontal line time-slot, the subscriber time-slot is approximately 64 microseconds in length. Under the assumption of 24 frames for each complete addressing cycle, 12,600 subscribers may be identified and one of these subscriber time-slots may be reserved for resetting all of the subscriber address counters by an exclusive, for example, 16 bit message from the central unit.

Referring to FIG. 1 in greater detail, studio equipment or an incoming network program will provide a composite video signal on line 23 along with a horizontal sync reference signal on line 25 and a vertical sync reference signal on line 27. The horizontal sync reference signal is supplied to a time discriminator 24 which also receives a 15,734 Hz output signal from a phase locked loop. The loop comprises the time discriminator 24, a low pass filter 27, a voltage controlled oscillator 29 and the several dividers 31, 33, and 35 along with their necessary counter reset connections which are coupled to block 37. The voltage controlled oscillator 29 is controlled by the filtered time discriminator output or error signal and runs at a frequency which is 16 × 2 × 16 × 15,734 or actually 8.0558 MHz. The output of this voltage controlled oscillator when multiplied by 14 provides the 112 MHz downstream pilot frequency for the transmitter 39. A 0.5 MHz signal is provided from the first divider 31 for the Manchester encoding and phase shift keyed modulation of the pilot carrier by way of encoder 41. The next divide by 2 counter 33 yields the 251.5 KHz bit rate for the digital data operations and the signal may also be used to interface the duplex data into and out of the mini-computer 11 whose operations are asynchronous with the remainder of the system and which may be organized for parallel word operations. The next divide by 16 counter 35 provides an output for synchronizing the subscriber time-slot operations between the subscribers and the input synchronization reference signal.

The vertical sync reference appearing on line 27 is supplied to a frame field and master reset timing loop which operates in a manner similar to the previously discussed horizontal sync loop, however, without a voltage controlled oscillator. This loop operates to synchronize the interrelated timing requirements by programming of reset commands to the dividers 43 and 45.

A data multiplexer 47 receives digital data from the character data buffer 49, control data from the computer interface and various timing control signals to generate the downstream data output. This data is Manchester encoded in the encoder 41 for transmission to the subscribers. With an assumed 16 bit word message, the last time-slot in a subscriber cycle should contain a master reset message which sets all subscriber terminal counters to zero so that each can count up to its unique time-slot count. The first three 16 bit words coming from the program sequence generator 51 may convey the encoding sequences employed for commutation or scrambling of the controlled access video programming and the following successive 16 bit time-slot messages convey control and data communication to successive subscribers and, for example, may include control data derived from computer routines resulting from an actual request by that subscriber during a previous cycle.

The time-slotted subscriber cycles are contiguous and continue for as long as the network is active. When a control data message is sent to a subscriber during his time-slot, the subscriber unit is so equipped that the subscriber can respond concurrently during that same time-slot with, for example, a request data message. The contiguous data stream to all these subscribers is thus matched with a contiguous data stream arriving at the network central location from individual subscribers which is identified as upstream data.

The radio frequency combiner 53 is a frequency diplexer which combines multiple signal channels onto and from the cable. Incoming signals from this combiner are supplied to an FM receiver 55 which may, for example, receive a frequency shift keyed pilot carrier containing the upstream data. When the upstream signal is demodulated and decoded according to well known techniques in the data decoder 57, it is then distributed by way of the multiplexer circuit 59 which under control of the computer by way of computer interface 15 functions to route the upstream data to either the computer interface of the character data buffer 49 to be interfaced with further information systems such as display or additional input-output equipment.

Network Central Unit

Figure 2:
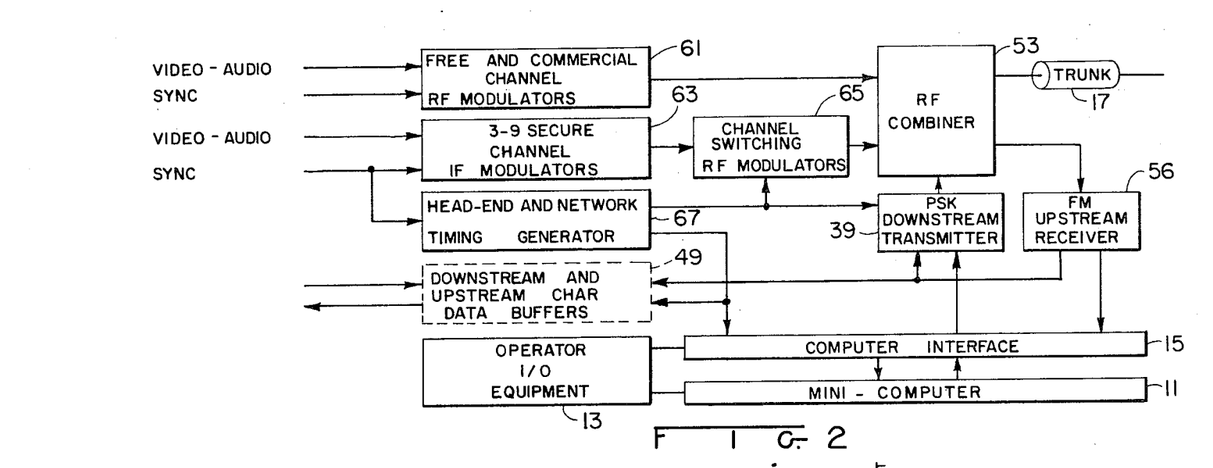
FIG. 2 is a block diagram of the network central unit.

A more general view of the central unit will be found in FIG. 2 wherein reference numerals from FIG. 1 have been carried over to identify substantially identical units within the equipment. The FM upstream receiver identified as 56 in FIG. 2 incorporates the functions of the data decoder 57 and multiplexer 59 of FIG. 1 for the sake of simplicity.

Figure 4:
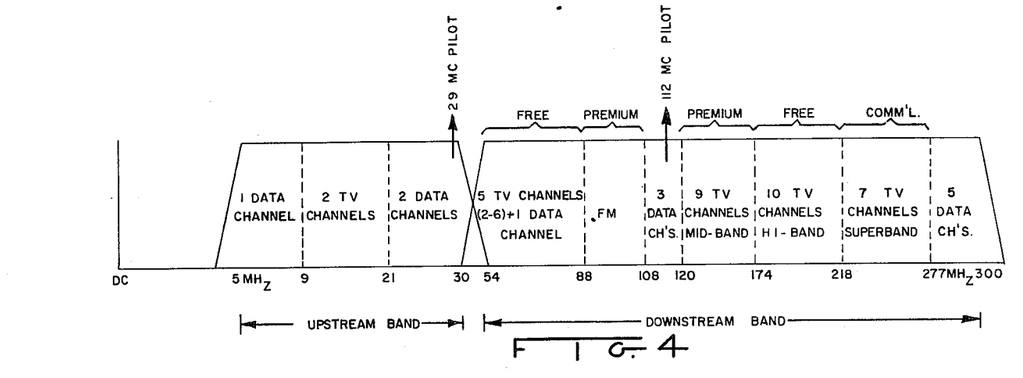
FIG. 4 illustrates a preferred allocation of frequencies in the broadband communication link.

In FIG. 2, the free and commercial television channels, for example, as depicted in FIG. 4, are supplied to the radio frequency combiner 53 from the RF modulators 61 in known manner. For premium and restricted programming, premium baseband video, synchronizing signals, and sound are first modulated on individual intermediate frequency carriers in the IF modulators 63. There are, for example, three to nine secure IF channels illustrated in the block 63 with the encoding occurring in groups of three such channels. The intermediate frequency carriers from modulators 63 are commuted within each group of three and the commutated intermediate frequency carriers modulate three radio frequency modulators in the channel switching and RF modulators block 65. This scrambling may, for example, occur by providing a first television program on one of the channels for a certain number of fields, then commuting this program to a second channel for another certain number of fields after which the program is commuted to yet the third channel for another certain number of fields after which the sequence is repeated. Two other television programs would, of course, similarly be stepped through each of the communication channels so that a normal television receiver receiving signals on one of these channels would see a few frames of one program followed by a few frames of the second and of the third programs, none of which would be of sufficient duration to be intelligible.

The scrambling sequence may be periodically changed by the head end computer.

The timing generator 67 uses the synchronizing signals from one of the premium program channels to reference all clocking and timing operations for the entire network including the synchronizing signals for the remaining premium and the free television signals. The output of the timing generator 67 controls the encoding scrambling rate, the subscriber addressing, the message bit rate and references the two data modulated pilot carrier frequencies.

The mini-computer 11 performs network management and control functions for all the subscribers as well as for the head end. This involves a closed loop cycle of subscriber status monitoring, internal bookkeeping and data processing, and management of subscriber initiated messages by means of a control message to each subscriber. Time sharing processes are employed to perform different functions at different times. In addition to the network control functions, the mini-computer 11 computes premium program billing according to time and a program rate schedule, maintains the required accounting records, tabulates network loading when a program viewing analysis is desired, determines access to restricted programming and lists the addresses and reactions from those subscribers watching programs where preference polling responses were requested. This can, of course, be co-ordinated by way of the operator input-output equipment 13.

Figure 3:
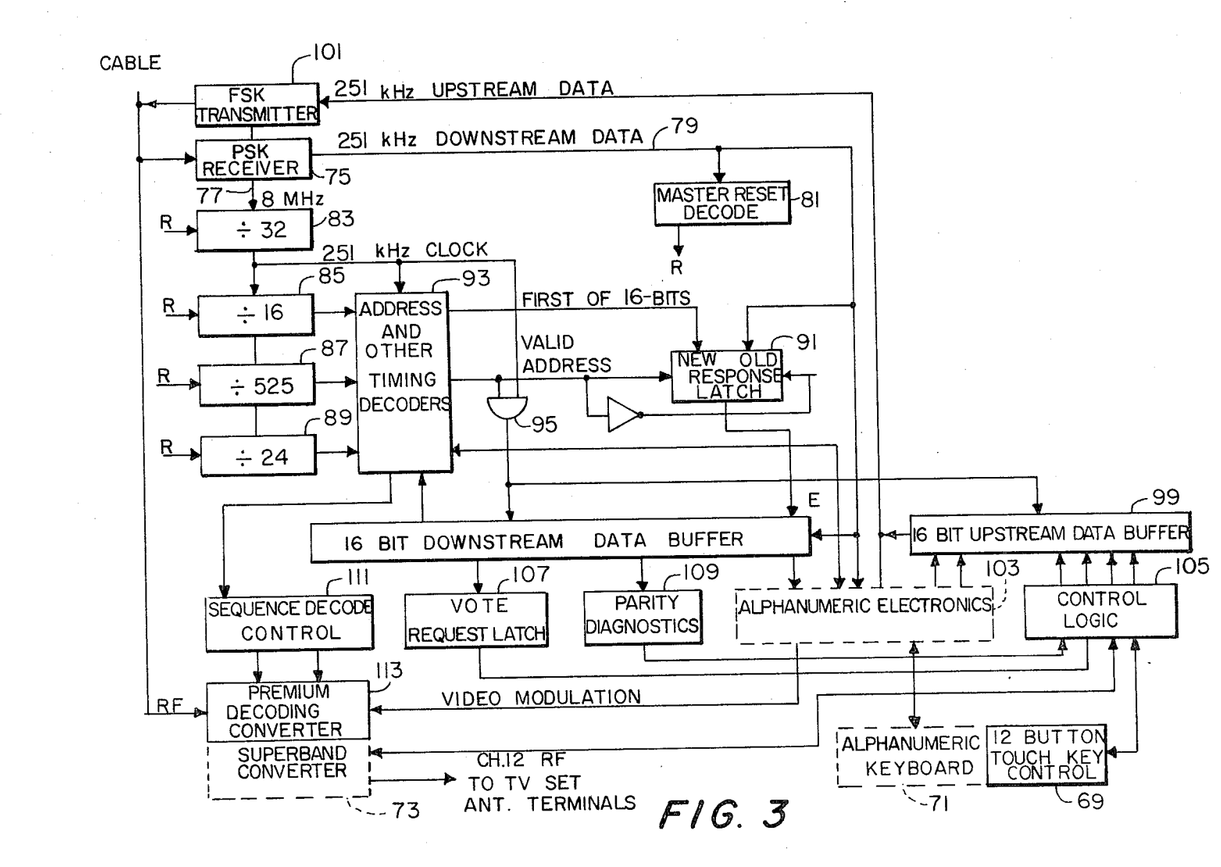
FIG. 3 is a block diagram of an illustrative one of the subscriber control units.

The system has optional provision for the transmission for the transmission and reception of alphanumeric characters and in FIGS. 2 and 3 those blocks indicated in dotted lines such as the downstream and upstream character data buffers 49 are optional and may be employed when alphanumeric character transmission and display is desired.

Subscriber Control Unit

The subscriber control unit 19 of FIG. 1 is the interface device between the CATV cable network and a subscriber's terminal equipment which in the simplest embodiment will be merely the subscriber's television receiver, however, in special applications it may interface with or be a part of dedicated data handling equipment for any of several special applications. As illustrated in FIG. 3, a 12 button touch key control 69 would be the only required subscriber input device and his TV receiver would be the only subscriber output device. Optional additional equipment illustrated in FIG. 3 includes an alphanumeric keyboard input device 71 and a converter 73 for converting the seven TV super band channels illustrated in FIG. 4 to a frequency compatible with the television receiver.

The subscriber control unit illustrated in the block diagram of FIG. 3 has a phase shift keyed receiver 75 which operates as a coherent data receiver with a phase locked loop to recover the network clocking signal and to keep signal data in synchronism with the head end timing. The Manchester encoded data arriving from the network central unit is modulated on the 112 MHz pilot carrier and since this modulation is either a zero or a one, there is no actual signal at the carrier frequency and the data and clock signals exist totally in the two side bands about the absent carrier. The Manchester encoding process is a process where the basic information bit rate is converted to a signal at double that bit rate with, for example, a 1,0 pair representing a 1 and a 0,1 pair representing a 0 and is a digital data modulation technique which splits the data power spectrum equally among the upper and lower side bands thus allowing recovery of the virtual carrier. The phase locked loop receiver tracks the virtual carrier narrow band fashion for transmission reliability and its output can then be used to reconstitute the 251.5 KHz clock signal which is the reference or synchronous TV related network timing. The phase locked loop detector output recovers the 8 MHz synchronous clock signal on line 77 which after division by 32 provides the digital data clocking signal. The digital signal itself is separately recovered from the same phase detector by way of a low pass 1 megacycle filter, for example, and that signal is then Manchester decoded to 251.5 KHz to convey the downstream digital communication data on line 79.

In order to completely establish unambiguous communication from the network central unit, a master reset decoder 81 is employed in each subscriber control unit to reset all of the counters in that subscriber control unit upon the occurrence of a reset signal which as noted earlier, may be 16 consecutive ones in the last time-slot of a subscriber cycle. This master reset signal operates to initialize the counter chain to zero by way of the input lines marked with a similar R to the four counter stages 83, 85, 87, and 89 and the old-new response latch 91.

Each subscriber will be assigned a unique time-slot and except for special data communication applications no two subscribers will have this same time-slot address. Normally, each subscriber control unit will be preset to decode its time-slot, for example, by a number of switches or shorting jumpers in the decoder circuitry 93.

Figure 5:
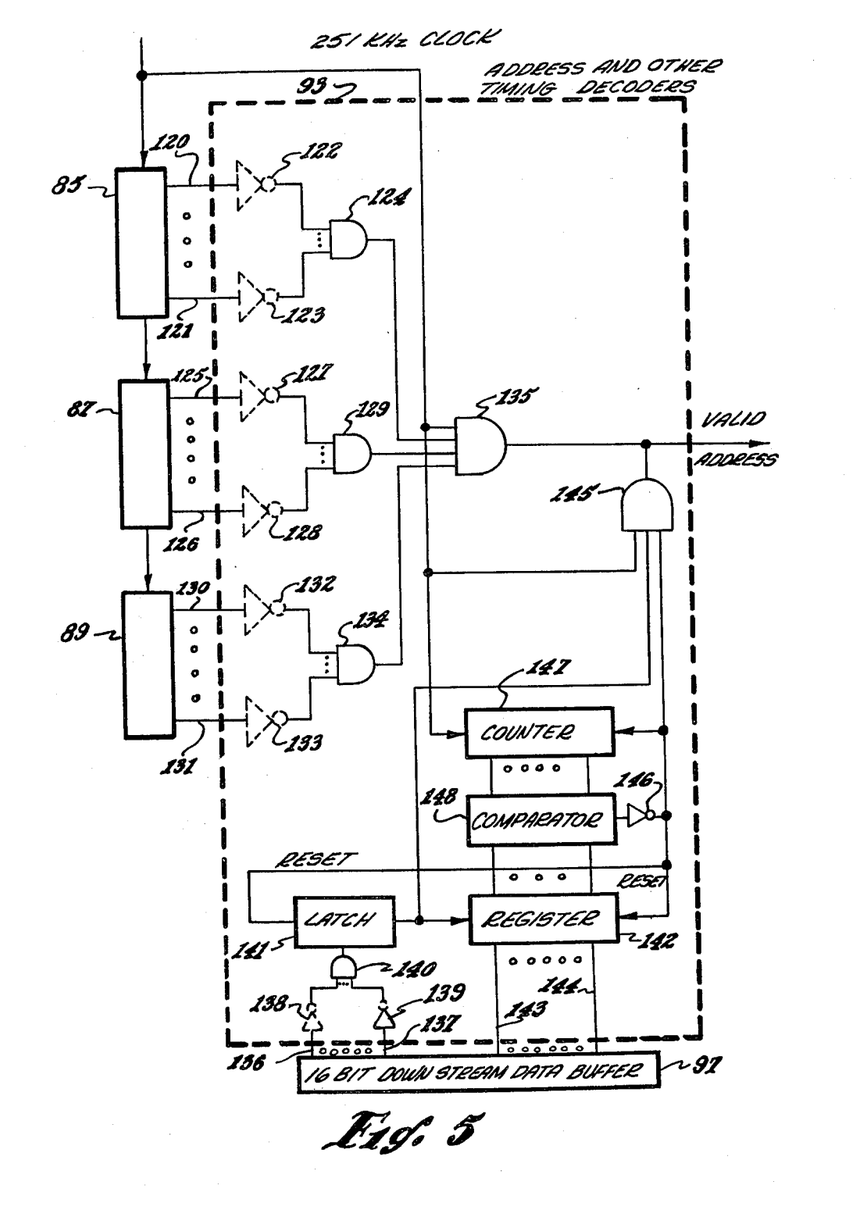
FIG. 5 is a schematic block diagram of the apparatus comprising addressing and other timing decoders in the subscriber unit.

Referring to FIG. 5, the decoder circuitry 93 according to one embodiment is shown. The binary signal contents of the individual cells of counters 85, 87, and 89 specify the current time-slot which is equivalent to the subscriber unit address. When the binary signal contents of the counters reach a specified value, the unique time slot or address associated with the subscriber unit is determined. The binary logic signals of the individual cells of counter 85 are supplied to input terminals of logic AND gate 124 via lines 120 through 121; the binary logic signals of the individual cells of counter 87 are supplied to input terminals of logic AND gate 129; and the binary logic signals of the individual cells of counter 89 are applied to input terminals of logic AND gate 134. In order to change logic "0" signals to logic "1" signals for activation of AND gates 124, 129, and 134, inverting amplifiers 122 through 123, 127 to 128 and 132 to 133 can be employed. However, many counters have inverse signal terminals as well as direct signal terminals associated with individual counter cells, and the inverse signal terminals can be utilized in place of the inverting amplifiers. When the binary logic signals corresponding to the specified number determining the address is present in the counters 85, 87, and 89, logic "1" signals will appear at the output terminals of gates 124, 129, and 134. These logic "1" signals as well as a signal from the clock are applied to input terminals of logic AND gate 135. When the predetermined address is in counters 85, 87, and 89, a valid address signal is applied to an output terminal of logic AND gate 135, allowing data to be exchanged between the subscriber unit and the head end equipment.

The remaining apparatus of FIG. 5 illustrates an embodiment in which several timing periods can be utilized for the exchange of information. Logic AND gate 140 has applied to input terminals binary logic signals from preselected cells of buffer 97. These signals are applied to gate 140 via lines 136 through 137 and as with the addressing apparatus inverting amplifier 138 through 139 can be employed to establish the presence of a logic "0" in a cell of buffer 97 at an input terminal of gate 140. Buffer 97 can, in some applications, have an inverse signal terminal available for each buffer cell, obviating the need for inverting amplifiers 138 through 139. When the contents of the preselected buffer cells have preselected binary signals, a logic "1" signal is applied to an output terminal of gate 140 setting latch 141. The setting of latch 141 causes a signal to be applied to register 142. Upon receiving the latch signal, register 142 loads in the individual cells the contents of preestablished cells of the buffer register 97 via lines 143 through 144. The contents of the register 142 can now be interpretted as a number. The output signal of latch 141 is also applied to an input terminal of logic AND gate 145. Another input terminal of gate 145 is coupled to the clock signal. The clock signal is also applied to counter 147, and the counter 147 increments one count for each clock pulse. Comparator 148 compares the contents of counter 147 with register 142. As long as the contents of the comparator and the register are not the same, a logic "0+ signal is applied to an output terminal coupled to an inverting amplifier 146. The output signal of the inverting amplifier 146 is applied to an input terminal of gate 145. A valid address signal is applied to an output terminal of gate 145 when a positive clock pulse, a latch signal, and a logic "1" signal is available from inverting amplifier 146. When the contents of register 142 are the same as the contents of counter 147, a logic "1" signal at the output terminal of the comparator resets latch 141 and register 142 and removes the valid address signal. As will be clear to those skilled in the art, a wide variety of apparatus can be employed to control the transfers of data from the head end apparatus to the subscriber unit in a manner similar to that described above.

In some special applications these switches might instead be a shift register which in addition to its normal preset address decoding could be signal controlled from the network central unit to line the subscriber control unit up with another subscriber control unit for long term controlled data communication. However, in normal operation decoder circuitry 93, which includes logic circuits with timing provided generally by the 251 KHz clock signal, supplies a valid address signal for the duration of a count in counters 85, 87, and 89 corresponding to the address of the subscriber control unit. That is, appropriate signals in counters 85, 87, and/or 89 are combined to produce a valid address signal. In summary, no address data is transmitted in the present system but rather every subscriber control unit is started counting by the master reset code and each identifies its own time-slot by having counted up to the prescribed predetermined value.

Gate 95 in FIG. 3 in response to a signal from the time-slot decoding circuitry 93, gates the 251 KHz clock signal to a pair of 16 bit data buffer registers 97 and 99 and basically identifies this particular subscriber control unit time-slot and causes the upstream data buffer 99 to transmit its contents by way of the frequency shift keyed transmitter 101 to the control unit and to accept the incoming information on line 79 into the downstream data buffer 97. The downstream message is further adapted to announce entry of a new control message into the buffer 97 when a change of service has been requested. This accomplishes a latched service operation and makes muting for time-slot borrowing possible.

The upstream data buffer 99 collects subscriber request and control monitoring data which is transmitted during the proper subscriber time-slot of each subscriber cycle. When the message goes upstream the first bit thereof indicates the data as a new request or as an old status indication. The data is shifted out of the register 99 by the valid address gated clock signal which may also turn the transmitter 101 on. The controls associated with the subscriber control unit normally consists of a twelve button touch key control 69.

Figure 6:
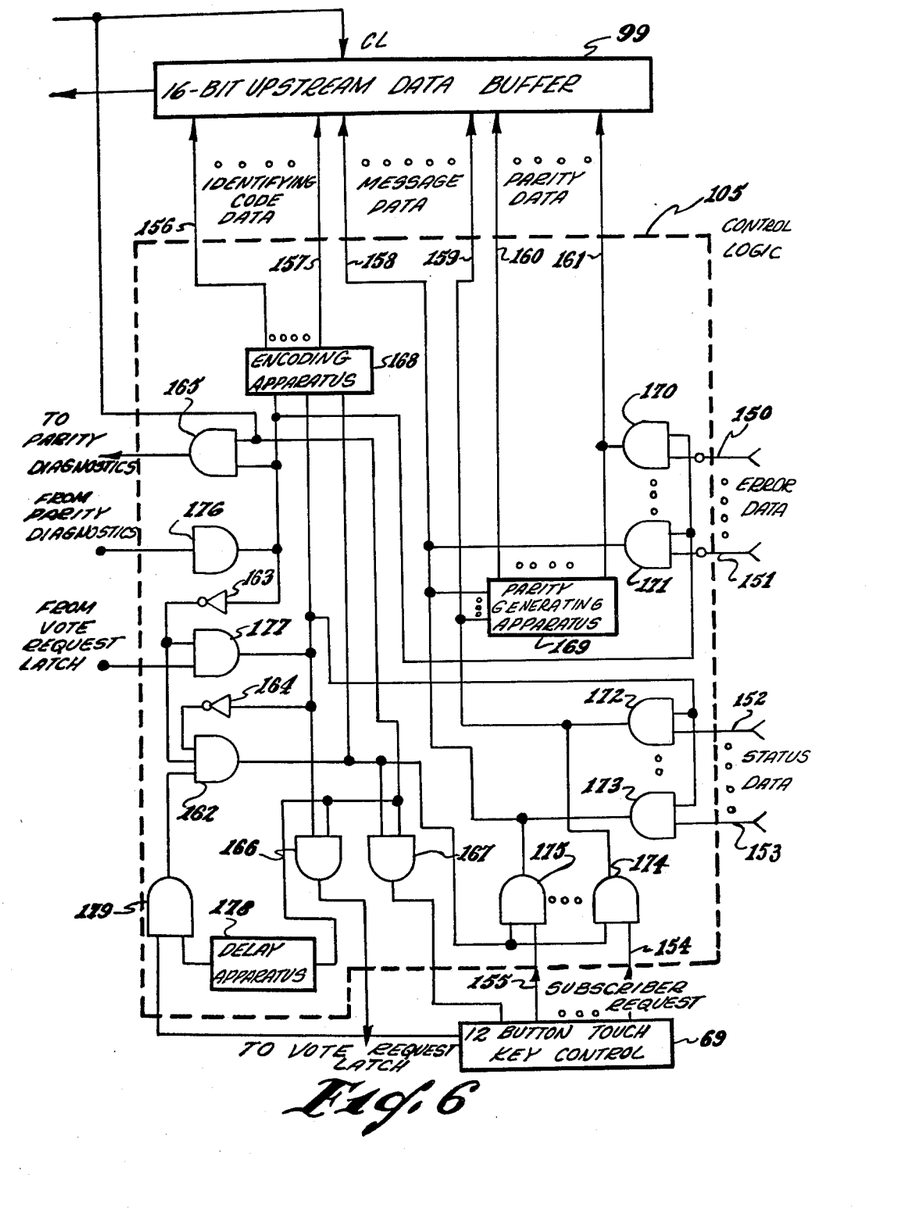
FIG. 6 is a schematic block diagram of the apparatus comprising control logic in the subscriber unit.

The apparatus controlling the messages transferred from the subscriber unit to the head end apparatus resides in the control logic 105 shown in FIG. 6. By way of illustration, assume that there are three types of messages to be delivered to the head end apparatus, error data applied to input data lines 150 through 151 of control logic 105, vote request, i.e. status request data applied to input data lines 152 through 153 of control logic 105 and subscriber request data applied from touch key control 69 to input data lines 154 through 155 of control logic 105. The vote or status request lines are coupled to apparatus indicating the operating status of the subscriber unit. The error data lines are coupled to individual cells of the 16-bit downstream buffer register 97. The format of data being transferred by the head end equipment, determined by control logic 105 is as follows: Output lines 156 through 157 of control logic 105 apply binary logic signals to associated cells of buffer 99 reserved for identifying code data specifying the nature of the accompanying message data; output lines 158 through 159 of control logic 105 is applied binary signals to associated cells of buffer 99 at positions reserved for the message or information part of the transfer; and output lines 160 through 161 of control logic 105 apply binary signal to positions of buffer 99 reserved for error identification of information transferred from the subscriber unit to the head end unit. Upon determination by parity diagnostics 169 that an error has occurred in the transmission of information from the head end apparatus to the subscriber unit, a positive logic "1" signal is applied to logic AND gate 176. A positive signal is thereafter applied by gate 176 to an input terminal of inverting amplifier 163, an input terminal of logic AND gate 165, a first input terminal of encoding apparatus 168 and two input terminals of logic AND gates 170 through 171. Input terminals of gates 170 through 171 are coupled to input lines 150 through 151 respectively. A positive logic signal applied to gate 176 applies a negative logic signal to input terminals of logic AND gate 177 and logic AND gate 162 thereby disabling those gates. The application of a logic signal to gates 170 through 171 enables the application of error data carried by lines 150 through 151 to cell of buffer register 99 associated with output lines 158 through 159 and 160 through 161. The activation of the gate 176 by the parity diagnostic apparatus has the highest priority of the message types in the present embodiment. When the vote request latch identifies a status request of the operation of the subscriber unit by the head end apparatus, a positive logic signal is applied to an input terminal of logic AND gate 176. A second input terminal of gate 162 receives a positive logic signal from the output terminal of inverting amplifier 163 unless there is a positive logic signal at the output terminal of gate 176. When positive logic signals are applied to the input terminals of gate 177, then the output terminal of gate 177 applies a positive logic signal to a second input terminal of encoding apparatus 168, an input terminal of inverting amplifier 164, an input terminal of logic AND gate 166 and input terminals of logic AND gates 172 through 173 respectively. Other input terminals of gates 172 through 173 are coupled to input lines 152 through 153 to which status information is applied. A positive logic signal applied to the output terminal of gate 177 causes the status data signals of input lines 152 through 153 to be applied to the cells of buffer register associated with output line 158 through 159. In addition, these data signals are applied to parity generating apparatus 169 and the output terminals of parity apparatus 169 are coupled to output lines 160 through 161, which in turn are coupled to buffer register cells reserved for parity information. When the subscriber attempts to communicate with the head end apparatus via touch key control 69, a positive logic signal from control 69 is coupled, via logic AND gate 179, to an input terminal of logic AND gate 162. To prevent certain timing problems, gate 179 is activated only during a delay clock pulse, the clock pulse delayed by delay apparatus 178. When, in addition, the output terminals of gate 176 and gate 177 are negative logic signals, positive logic signals are applied to the remaining input terminals of gate 162 via inverting amplifier 163 and inverting amplifier 164, and a positive logic signal is applied to an output terminal of gate 162. A positive logic signal at the output terminal of gate 162 causes a positive logic signal to be applied to a third input terminal of encoding apparatus 168, an input terminal of gate 167 and input terminals of logic AND gates 174 through 175. The input terminal of encoding apparatus 168 activated by gate 176, 177, or 162, activates binary signal apparatus of 168 for applying signals to selected cells identifying the nature of the data in buffer 99. Other input terminals of gates 174 through 175 are coupled to input lines 154 through 155 which are in turn coupled to output terminals of key control 69. A positive logic signal at an output terminal of gate 162 causes binary signals from key control 69 to be applied to output lines 158 through 159 and ultimately to the message data cells of buffer register 99. In addition, the parity generating apparatus 169 produces appropriate parity bits for inclusion in the register cells associated with output lines 160 through 161. To prevent continuous repetition of information, the input clock pulses are applied to input terminals of gates 165, 166, and 167. The output terminals of gates 165, 166, and 167 return a binary signal to parity diagnostics apparatus 109, vote latch request 107, or key control 69, respectively, upon transmission of the data by the upstream buffer register 99 of the corresponding information the head end equipment. These binary signals indicate completion of the required data transmission. When the vote latch request and parity diagnostic signals are activated upon removal of the clock pulse from buffer register 97, no timing problems arise when the data is entered into the downstream buffer 97 once during every address cycle. For more frequent data reception by buffer 97, additional timing apparatus may be required to insure the integrity of the data transmitted from the upstream buffer register as will be clear to those skilled in the art.

Figure 7:
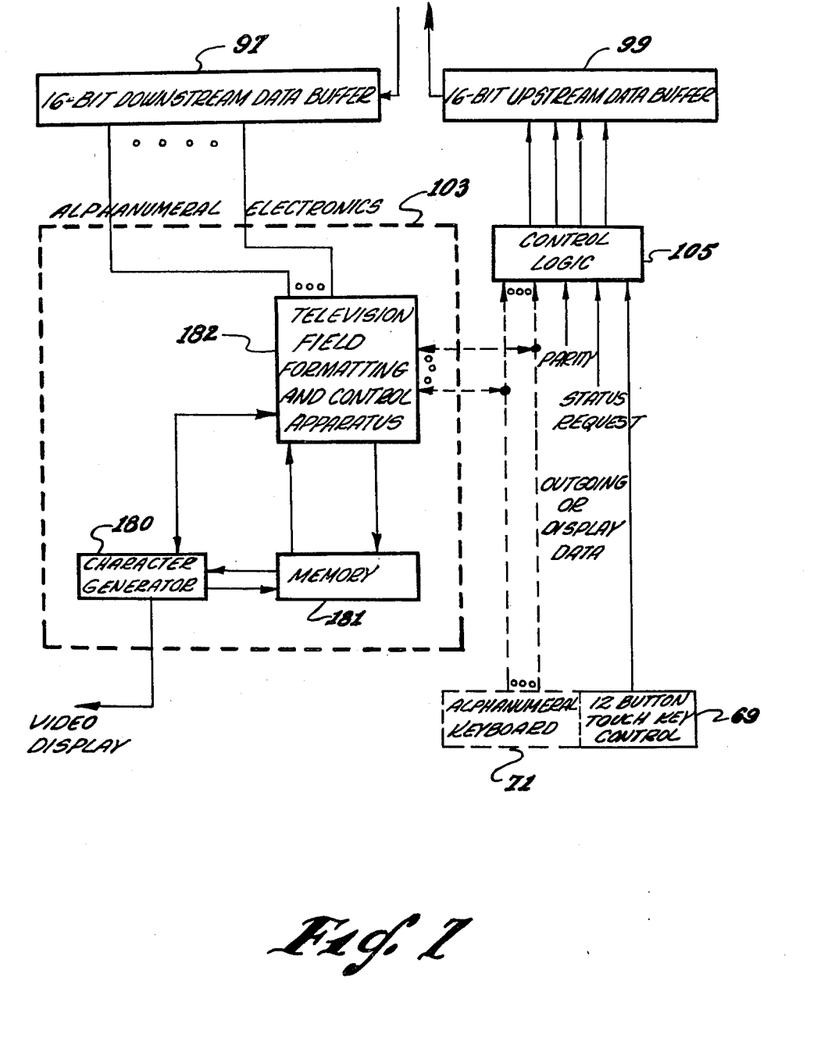
FIG. 7 is a block diagram of the alphanumeric electronics in an expanded subscriber unit.

When alphanumeric functions are included, this control panel may be replaced with the more complex 64 character control keyboard 71 in FIG. 7 to operate normal as well as alphanumeric services. The alphanumeric electronics 103 would then have to be added to the subscriber control unit. The control logic circuitry 105 which is analogous to but less complex than the alphanumeric electronics 103 will sense the operational status of the subscriber control unit such as an indication that the subscriber is viewing a premium program and will compose control functions for upstream request communications when the appropriate control keys are operated. The vote request latch and parity dignostics 107 and 109 allow the central unit to interrogate a subscriber unit during one subscriber cycle and receive a response to that interrogation during the next subscriber cycle.

The inclusion of the alphanumeric electronics and alphanumeric keyboard 71, the communication capability between the head end equipment and the subscriber unit is greatly enhanced. The alphanumeric electronics 103 includes a character generator 180, a memory 181, and a television field formatting and control apparatus 182. Signals from the head end equipment are entered in downstream data buffer register 97 and entered in television field formatting and control apparatus. The control apparatus 182 provides a consistent format to video scenes displaying the incoming information and converts the incoming data signals in a manner suitable for controlling character generator 180. Under control of the control apparatus, character generator 180, utilizing the data stored in memory 181 provides a video display of the information. Similarly, when the subscriber unit is used to enter data via alphanumeric keyboard 71, the control logic 105 enters the data in the upstream data buffer. Simultaneously, however, the alhanumeric data transmitted upstream can be stored in the memory. In that fashion, the communications from the head end equipment and the subscriber unit can be simultaneously displayed on the video display. In another embodiments, to expedite communication, the upstream data to be communicated to the head end equipment can be stored and edited until the message is complete. The contents of the memory can be transmitted continuously until the message is complete instead of utilizing the allotted address time slots.

The premium decoding converter 113 of FIG. 3 sequentially provides local oscillator signals of the appropriate frequency to track with a specified one of the premium programs. The sequence of frequencies required is provided by the sequence decode control unit 111 which as noted earlier may be periodically updated by a new code sequence transmitted from the control unit. This decoding sequence is initialy supplied to the subscriber control unit from the central unit in response to a request entered on the manual control 69 for that particular program.

Thus, while the present invention has been described with respect to a specific preferred embodiment, numerous modifications will suggest themselves to those of ordinary skill in the art, and accordingly the scope of the present invention is to be measured only by that of the appended claims.

We claim:

1. In a subscriber television system having a central unit and a plurality of subscriber units interconnected by at least one tree-organized wideband communication link capable of simultaneously carrying a plurality of communication channels, certain channels of which carry information including a plurality of video signals from the central unit to subscriber units and other channels of which carry information from subscriber units to the central unit, the improvement comprising:
   means at the central unit for providing reference synchronizing signals;
   means at the central unit for transmitting pulses over at least one of the certain channels which pulses are provided a reference by the synchronizing signals;
   means at the central unit for periodically transmitting a reset signal;
   means at each subscriber unit for counting the transmitted pulses;
   means at each subscriber unit and responsive to a received reset signal for returning the corresponding counting means to an initial count;
   means at each subscribing unit for providing a subscriber unit enabling signal in response to a predetermined count by the counting means, the predetermined count being different for different subscriber units; and
   means at the central unit for transmitting a plurality of video signals, at least one said video signal being synchronized to the reference synchronizing signal.

2. The improvement of claim 1 wherein each subscriber unit includes buffer storage means and means responsive to the predetermined subscriber count for transmitting the data in the buffer storage means as carrier encoded digital data to the central unit.

3. The improvement of claim 1 wherein each subscriber unit includes buffer storage means, means for demodulating incoming carrier encoded digital data, and means responsive to the predetermined subscriber count for gating the demodulated digital data into the buffer storage means.

4. The improvement of claim 1 wherein the central unit further comprises digital computer means, and computer interface means including digital data buffering means, the computer interface means being responsive to the reference synchronizing signals for transferring digital data between the computer means and other portions of the central unit.

5. The improvement of claim 1 wherein the frequency of the transmitted pulses is an integral multiple of the horizontal scan frequency of the video signals.

6. The improvement of claim 5 wherein the horizontal scan frequency is an integral multiple of the frequency of occurrence of the reset signal.

7. In a subscriber television system having a central unit and a plurality of subscriber units interconnected by a tree-organized wideband communication link capable of simultaneously providing a plurality of communication channels, certain channels of which carry information including a plurality of video signals from the central unit to subscriber units to the central unit, the improvement comprising:
   means at the central unit for providing reference synchronizing signals;
   means at the central unit for transmitting pulses over at least one of the said certain channels which pulses are clocked by the synchronizing signals;
   means at the central unit for periodically transmitting a reset signal;
   means at each subscriber unit responsive to the transmitted pulses and to said periodic reset signals for providing a subscriber unit enabling signal, the last mentioned means including timing means for insuring that only one subscriber unit enabling signal occurs at any one time; and
   means at the central unit for transmitting a plurality of video signals at least one of which is synchronized with the reference synchronizing signal.

8. The improvement of claim 7 wherein the frequency of the transmitted pulses is an integral multiple of the horizontal scan frequency of the at least one video signal and is an integral multiple of the frequency of occurrence of the reset signal.

9. The improvement of claim 7 wherein each subscriber unit includes buffer storage means, means for demodulating incoming carrier encoded digital data and means responsive to the subscriber unit enabling signal for gating the demodulated digital data into the buffer storage means.

10. The improvement of claim 7 wherein each subscriber unit includes a buffer storage means responsive to the subscriber unit enabling signal for transmitting data in the buffer storage means as carrier encoded digital data to the central unit.

* * * * *